(12) United States Patent
Toth et al.

(10) Patent No.: US 11,872,976 B2
(45) Date of Patent: Jan. 16, 2024

(54) SYSTEM AND METHOD FOR AUTOMATICALLY STOPPING AN AUTONOMOUS VEHICLE

(71) Applicant: Knorr-Bremse Systeme Fuer Nutzfahrzeuge GmbH, Munich (DE)

(72) Inventors: Zoltan Toth, Budapest (HU); Oliver Udvardy, Budapest (HU); Gabor Toth, Budaors (HU); Peter Simon, Zalaegerszeg (HU)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 0 days.

(21) Appl. No.: 17/777,744

(22) PCT Filed: Dec. 8, 2020

(86) PCT No.: PCT/EP2020/085082
§ 371 (c)(1),
(2) Date: May 18, 2022

(87) PCT Pub. No.: WO2021/116106
PCT Pub. Date: Jun. 17, 2021

(65) Prior Publication Data
US 2022/0402470 A1    Dec. 22, 2022

(30) Foreign Application Priority Data
Dec. 13, 2019  (EP) ..................................... 19215977

(51) Int. Cl.
*B60T 8/00*      (2006.01)
*B60T 8/92*      (2006.01)
(Continued)

(52) U.S. Cl.
CPC ................ *B60T 8/92* (2013.01); *B60Q 5/005* (2013.01); *B60T 7/12* (2013.01); *B60T 17/22* (2013.01);
(Continued)

(58) Field of Classification Search
CPC ... B60T 8/92; B60T 7/12; B60T 17/22; B60T 2270/402; B60T 2270/406; B60W 60/001;
(Continued)

(56) References Cited

U.S. PATENT DOCUMENTS

2002/0020574 A1* 2/2002 DeLuca ................. B60T 7/042
                                                  180/275
2005/0288843 A1    12/2005 Lindqvist
(Continued)

FOREIGN PATENT DOCUMENTS

CN    103167976 A    6/2013
CN    103842220 A    6/2014
(Continued)

OTHER PUBLICATIONS

Intnernational Search Report dated Feb. 22, 2021 in connection with PCT/EP2020/085082.

*Primary Examiner* — Truc M Do
(74) *Attorney, Agent, or Firm* — NORTON ROSE FULBRIGHT US LLP; Gerard A. Messina (57) ABSTRACT

A system for automatically stopping an autonomous vehicle, in which the autonomous vehicle includes a primary brake and a secondary brake controlled by least one control module or different control modules. The system includes: an error detection module configured to detect an error in the control of the primary brake or the secondary brake by the one control module or the different control modules; and a supplemental control module configured, upon a detected
(Continued)

error by the error module, to cause a stop of the autonomous vehicle using the primary brake or the secondary brake.

14 Claims, 6 Drawing Sheets

(51) Int. Cl.
| | |
|---|---|
| *B60W 60/00* | (2020.01) |
| *B60Q 5/00* | (2006.01) |
| *B60T 7/12* | (2006.01) |
| *B60T 17/22* | (2006.01) |
| *B60W 10/18* | (2012.01) |
| *B60W 10/196* | (2012.01) |
| *B60W 10/30* | (2006.01) |
| *B60W 30/18* | (2012.01) |
| *B60W 50/02* | (2012.01) |
| *B60W 50/029* | (2012.01) |
| *B60W 50/035* | (2012.01) |

(52) U.S. Cl.
CPC ........ *B60W 10/182* (2013.01); *B60W 10/196* (2013.01); *B60W 10/30* (2013.01); *B60W 30/18109* (2013.01); *B60W 50/0205* (2013.01); *B60W 50/029* (2013.01); *B60W 50/035* (2013.01); *B60W 60/001* (2020.02); *B60T 2270/402* (2013.01); *B60T 2270/406* (2013.01); *B60W 2050/0297* (2013.01); *B60W 2710/18* (2013.01); *B60W 2710/30* (2013.01)

(58) Field of Classification Search
CPC .. B60W 10/182; B60W 10/196; B60W 10/30; B60W 30/18109; B60W 50/0205; B60W 50/029; B60W 50/035; B60W 2050/0297; B60W 2710/18; B60W 2710/30; B60Q 5/005

See application file for complete search history.

(56) References Cited

U.S. PATENT DOCUMENTS

| | | | |
|---|---|---|---|
| 2010/0114445 | A1 | 5/2010 | Groult |
| 2015/0153735 | A1* | 6/2015 | Clarke ................ B60W 30/00 701/301 |
| 2017/0210361 | A1 | 7/2017 | Kotera et al. |
| 2018/0165895 | A1* | 6/2018 | Poeppel ............... G07C 5/0808 |
| 2018/0201138 | A1* | 7/2018 | Yellambalase .......... B60L 53/16 |
| 2018/0229738 | A1* | 8/2018 | Nilsson ............ B60W 50/0205 |
| 2019/0210584 | A1 | 7/2019 | Wood |

FOREIGN PATENT DOCUMENTS

| | | |
|---|---|---|
| CN | 105599766 A | 5/2016 |
| CN | 106166993 A | 11/2016 |
| CN | 108422994 A | 8/2018 |
| CN | 108773268 A | 11/2018 |
| CN | 110239541 A | 9/2019 |
| CN | 110481564 A | 11/2019 |
| DE | 102014004110 A1 | 9/2015 |
| EP | 3363698 A1 | 8/2018 |
| EP | 3505408 A1 | 7/2019 |
| WO | 2018038256 A1 | 3/2018 |

\* cited by examiner

SYSTEM AND METHOD FOR AUTOMATICALLY STOPPING AN AUTONOMOUS VEHICLE

FIELD OF THE INVENTION

The present invention relates to a system and a method for automatically stopping an autonomous vehicle and, in particular, to an implementation of a graceful degradation of failures of autonomous vehicles by a braking system.

BACKGROUND INFORMATION

One key element of handling of failures is to achieve a graceful degradation, i.e. to end up in a safe situation—even though the control is partly or entirely lost. For this, mitigation steps should be implemented to avoid any injuries of traffic participants until the potentially dangerous situation is resolved or a remaining risk is kept at a minimum or an acceptable level. In the evaluation of the risk the ability of the involved persons will be accessed (e.g. the driver) to avoid specified harm through a timely reaction, wherein observations, reactions and actions of the driver are considered in many situations.

In conventional systems, once the failure has been detected by the vehicle, a possible warning (typically a red warning lamp) is given to the driver and it is assumed that the driver is always available to resolve the situation—for example, by safely stopping the vehicle while strictly taking into account the actual driving situation.

However, for autonomous vehicles (autonomously operated vehicles), this conventional handling of failures is not available and other methods are needed to achieve a mitigation. Nevertheless, it is important that also autonomous vehicles maintain a high level of control over all vehicle components at each time of operation. For example, if some components are affected by a control failure, it should always be possible to safely stop the vehicle with no or only limited available functions of the vehicle.

Conventional autonomous systems typically achieve this objective by adding supplementary sensing and controlling elements or implementing redundant components or even by allowing a remote human control. In other systems, an early detection of the fault is implemented to use autonomous functions to handle situations in a reduced mode.

However, all these systems do not yet achieve the desired reliability or add more complexity. In addition, for autonomous operations human interactions are generally not available. Hence, a failure in a control function in autonomous vehicles results in a lack of confidence for the operations performed by the autonomous vehicle.

Therefore, there is a demand for further improvements to increase safety in situations where the control over the vehicle is partly or entirely lost.

SUMMARY OF THE INVENTION

At least some of the above-mentioned problems may be overcome by a system for automatically stopping an autonomous vehicle according to the description herein or by a method according to the description herein. The dependent claims refer to specifically advantageous realizations of the subject matters defined in the main descriptions herein.

The present invention relates to a system for automatically stopping an autonomous vehicle. The autonomous vehicle includes a primary brake and a secondary brake controlled by one or more control module(s). The system comprises an error detection module and a supplemental control module. The error detection module is configured to detect an error in the control of the primary brake or the secondary brake by the at least one control module. The supplemental control module is configured, upon a detected error by the error detection module, to cause a stop of the autonomous vehicle using the primary brake or the secondary brake (e.g., dependent on which brake system is available and has not lost its connection to the at least one control module).

Optionally, the different control modules include a primary control module for controlling the primary brake and a secondary control module for controlling the secondary brake. Therefore, there may be one common control module for more than one brake systems or there may be separate independent control modules for some of the braking systems.

The vehicle is, in particular, a commercial vehicle, even though the invention shall not be limited thereto. The at least one control module may be or may include autonomous control logic responsible for the autonomous driving operation. It may be implemented in one or more electronic control unit(s) (ECU) of the vehicle that is/are responsible for the control of the brakes. In general, within the present disclosure, the term "module" shall cover not only a physical entity but also any software module implemented, e.g., in a control unit. Hence, the at least one control module and the supplemental control module may be implemented within a same physical entity—although the embodiments shall not be limited thereto.

The error detection may simply relate to a reception of a corresponding error signal or a warning that is reported/issued by one control unit of the vehicle. However, the error detection module may also be able to access corresponding sensors that sense a failure resulting in a loss of control. Both, the error detection module and the supplemental control module may be implemented (e.g. by software in form of a routine) in any available control unit. This control unit may be independent of the at least one control module to ensure that the supplemental control module is not affected by the detected error. However, it does not need to be a separate entity (although, it could be).

Optionally, the supplemental control module is configured to stop the autonomous vehicle using at least one of the following deceleration profiles:
 a constant deceleration,
 piecewise constant decelerations in subsequent time periods,
 a non-constant deceleration,
 start with a lower deceleration followed by a higher deceleration, or vice versa, to allow following vehicles to adapt to the stopping of the autonomous vehicles,
 an adjusted deceleration to increase or to maximize the braking time to avoid an overheating of brake pads.

Optionally, the vehicle is configured to be driven in a coordinated movement with one or more other vehicles such as vehicle platooning and the supplemental control module is configured:
 to start a vehicle deceleration after an idle time to allow to distribute an intended braking to the one or more other vehicles; and/or
 to stop the vehicle in a way that a following non-autonomous vehicle is able to prepare itself (e.g. based on the defined deceleration profiles).

Optionally, the coordinated movement is defined in the configuration data and the supplemental control module is configured to receive or to send data related to the configuration data from/to the other vehicle(s) to enable a consideration of the configuration data.

In general, the vehicle platooning will be characterized in the respective configuration data, which may include parameters defining the coordinated movement such as: optimal distances between the vehicles, speed values or speed ranges, braking abilities of the involved vehicles, cargo, weights etc. These parameters may be given to all participants of the vehicle platooning. However, it may also be possible that the at least some of them can be estimated (e.g. braking possibilities depend on the type of vehicle, the distances can be determined or estimated from sensor data etc.). The configurations data may depend on the road conditions/temperature and/or may be adjusted based thereon.

Optionally, in case a data transfer between platooning vehicles is not possible, the supplemental control module is configured to estimate the configuration data of the coordinated movement.

Optionally, the supplemental control module is further configured to allow an instant release of the used brake to enable a restart of the vehicle after the stop. The restart may be allowed immediately after stopping. However, before allowing the restart, it may be checked that the standstill status of the vehicle is safe (no risk of rolling away).

Optionally, the vehicle includes a horn and the error detection module or the supplemental control module is configured to activate the horn to alert surrounding traffic participants (e.g. other drivers) about an impending stop of the autonomous vehicle.

Optionally, the error detection module is configured to report the detected error. This reporting may include adding an entry into a log file or sending a warning or sending a report etc.

Optionally, the system may include or has access to an independent power supply to ensure electric power even in cases where the power supply for the at least one control module is disrupted.

Embodiments relate also to an autonomously operable vehicle with a system as defined before. Optionally, the primary brake is a service brake and the secondary brake can include at least one of the following brake systems: a parking brake, a hand brake, an emergency brake, an auxiliary brake, a retarder brake.

Further embodiments relate to a method for automatically stopping an autonomous vehicle. The autonomous vehicle includes again a primary brake and a secondary brake which are controlled by at least one control module. The method includes:

detecting an error, by an error detection module, in the control of the primary brake or the secondary brake by the at least one control module; and causing a stop of the autonomous vehicle, by a supplemental control module upon a detected error by the error detection module, using the primary brake or the secondary brake.

The step of detecting may be or may include a receiving of a corresponding error signal from another control unit/module. In addition, the detected error may be sent to the supplemental control module to trigger starting the stopping routine. Similarly, causing the stop may be or include sending corresponding signals to brake actuators or modulate a pneumatic pressure to trigger an activation of the corresponding brake.

This method or at least parts thereof may also be implemented in software or a computer program product, the order of steps may or may not be important to achieve the desired effect. Embodiments of the present invention can, in particular, be implemented by software or a software module in an ECU (electronic control unit). Therefore, embodiment relate also to a computer program having a program code for performing the method, when the computer program is executed on a processor.

Some examples of the systems and/or methods will be described in the following by way of examples only, and with respect to the accompanying figures.

DETAILED DESCRIPTION

Figure 1A:
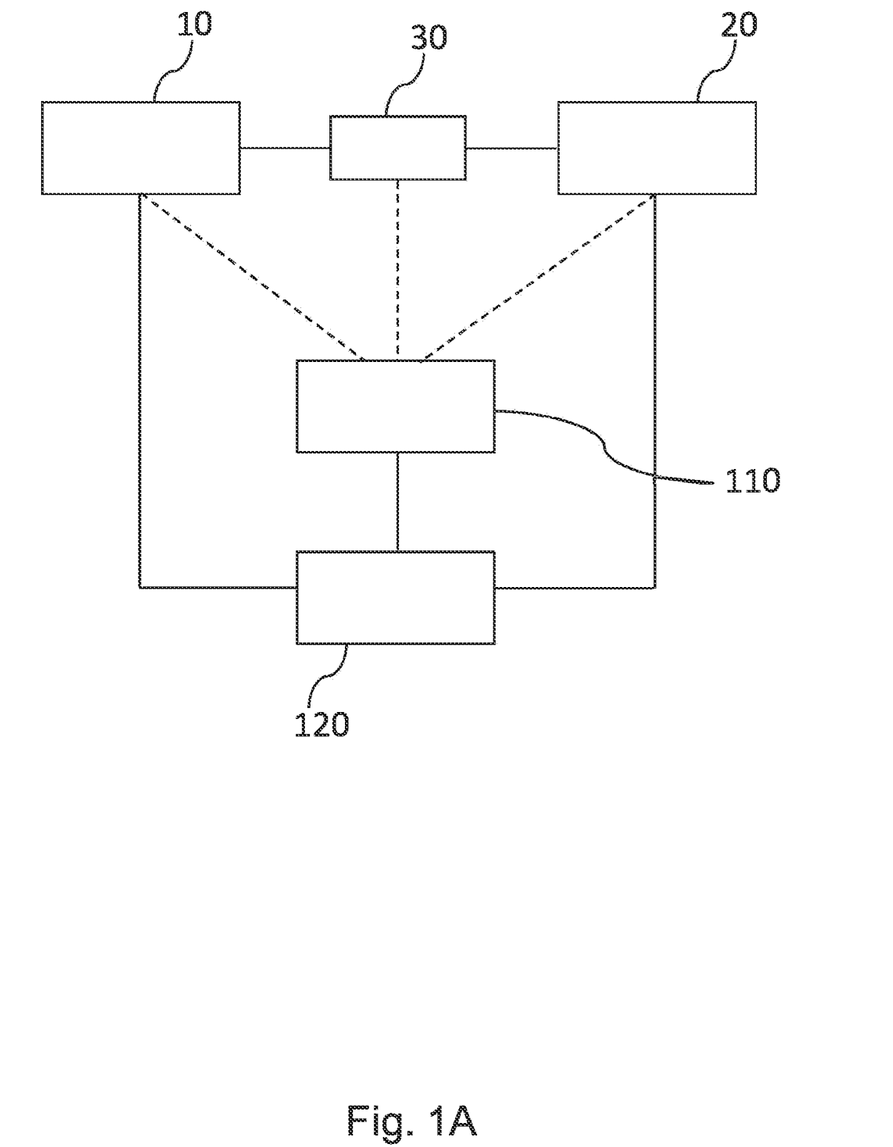
FIG. 1A depicts a system according to an embodiment of the present invention.

FIG. 1A depicts a system according to an embodiment for stopping an autonomous vehicle that includes a primary brake 10 and a secondary brake 20 controlled by one control module 30. The system comprises an error detection module 110 and a supplemental control module 120. The error detection module 110 is configured to detect an error in the control of the primary brake 10 or the secondary brake 20 by the control module 30. The dashed lines shall indicate that this information can come from any of the involved components 10, 20, 30. The supplemental control module 120 is configured, upon a detected error by the error detection module 110, to cause a stop of the autonomous vehicle using the primary brake 10 or the secondary brake 20.

The primary brake 10 may be a service brake and the secondary brake 20 can include at least one of the following brake systems: a parking brake, a hand brake, an emergency brake, an auxiliary brake, a retarder brake. Since the service brake 10 may be the default brake during normal driving situations, the secondary brake 20 may be employed for this emergency stop. However, this should not limit the present invention, because, also the primary brake 10—if available—may be used for the emergency stop.

According to further embodiments, issues in the control loss in the braking system are resolved by implementing an intelligent emergency braking to safely stop the vehicle using an available braking system. For this, it is of advantage if the supplemental control module is implemented in another control unit, i.e. not in the one that is normally responsible for the controlling of the brake system(s). This may ensure that supplemental control module 120 will not be affected by the detected failure.

Furthermore, when a failure in the control system occurs and thus the operation of the vehicle's intelligent logic cannot be guaranteed anymore, the supplemental control module 120 will or might ensure that—during the stopping of the vehicle—an adaptation and consideration to/of the actual traffic situation is still ensured. Therefore, in general, the stopping may depend on the traffic situation.

According to embodiments these adaptations consider many traffic situations. In particular, one or more of the following aspects may be considered in the process of stopping the vehicle:

- in vehicle platooning, a communication/estimation of configuration data is implemented;
- blocking wheels are avoided on any axle (in particular, jack-knifing situations are to be avoided);
- the vehicle is kept in a given lane, parallel or opposite lanes should not be entered;
- strong braking actions shall be avoided: (i) to prevent a risk of blocking wheels resulting in a friction loss, and (ii) to allow the following vehicle to adapt to a braking situation and not to run into the autonomous vehicle;
- a foreseeable misuse of neglecting a tracking distance to a vehicle ahead may be considered;
- a too long braking resulting in an overheating of brake pads is avoided (this may lead to a loss of the brake force or even cause fire in extreme situations);
- once the vehicle has stopped, embodiments allow to move the vehicle for example to restart the vehicle;
- when the vehicle is stopped in a dangerous zone such as a railway crossing or a street crossing, the vehicle is not blocked, but can be driven away (for example by a driver or another person);
- when the vehicle is to be moved away, overheated brakes should be prevented to allow moving the vehicle safely to a new location with properly working brakes.

Embodiments implement an intelligent braking by taking into account these aspects. As set out in the following, embodiments apply an appropriate deceleration profile that avoids the potentially dangerous situations as mentioned before.

Figure 1B:
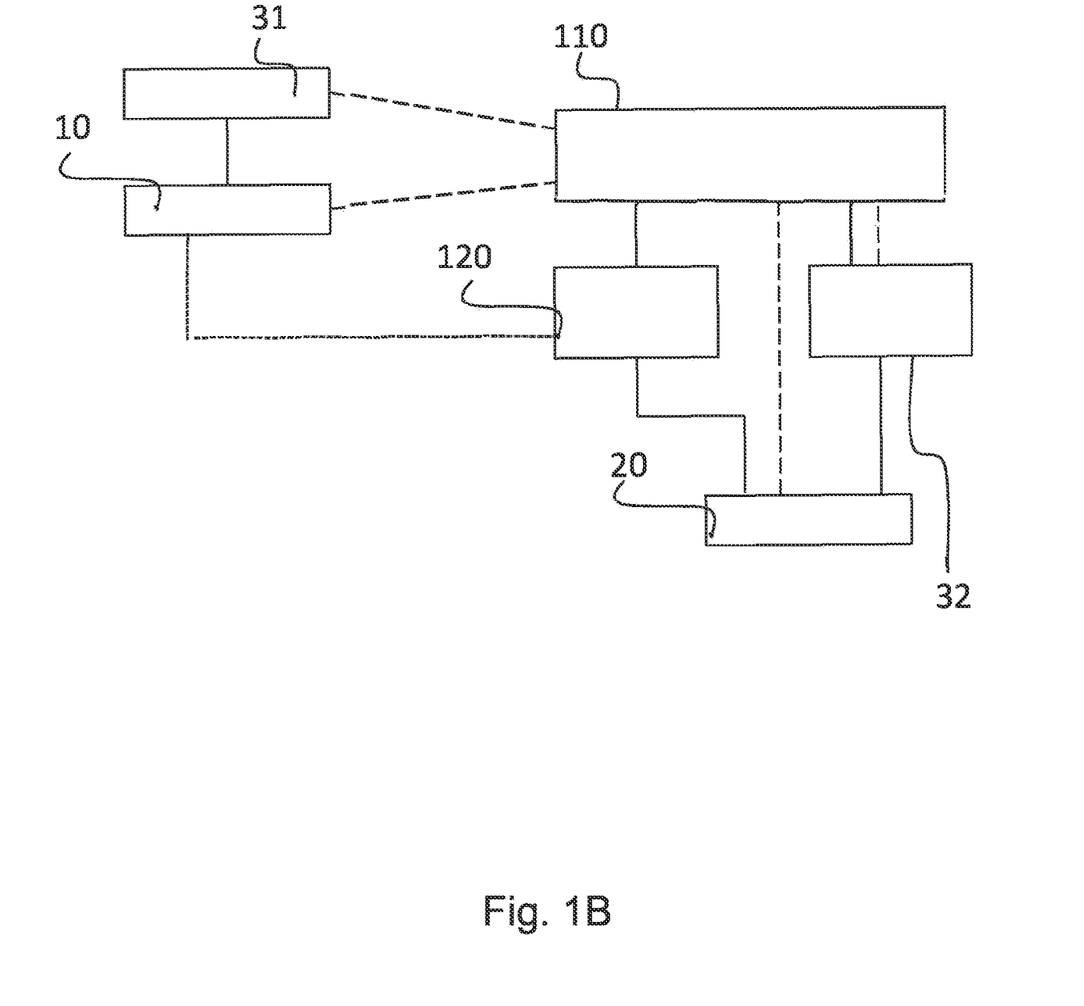
FIG. 1B depicts a system according to an embodiment of the present invention with another architecture.

FIG. 1B depicts a system according to an embodiment of the present invention with another architecture. In this embodiment the primary brake 10 is controlled by primary brake control module 31. The secondary brake 20 is controlled by a secondary control module 32. The primary control module 31 and the secondary control 32 module are different control modules, errors in both of them can be detected by the error detection module 110, which in turn communicates the supplementary control module 120, which acts in the same way as described in FIG. 1A. The dashed lines indicate optional control lines. Therefore, the difference to the embodiment in FIG. 1A relates only to the dedicated control modules 31, 32 for the primary brake 10 and the secondary brake 20.

Figure 2:
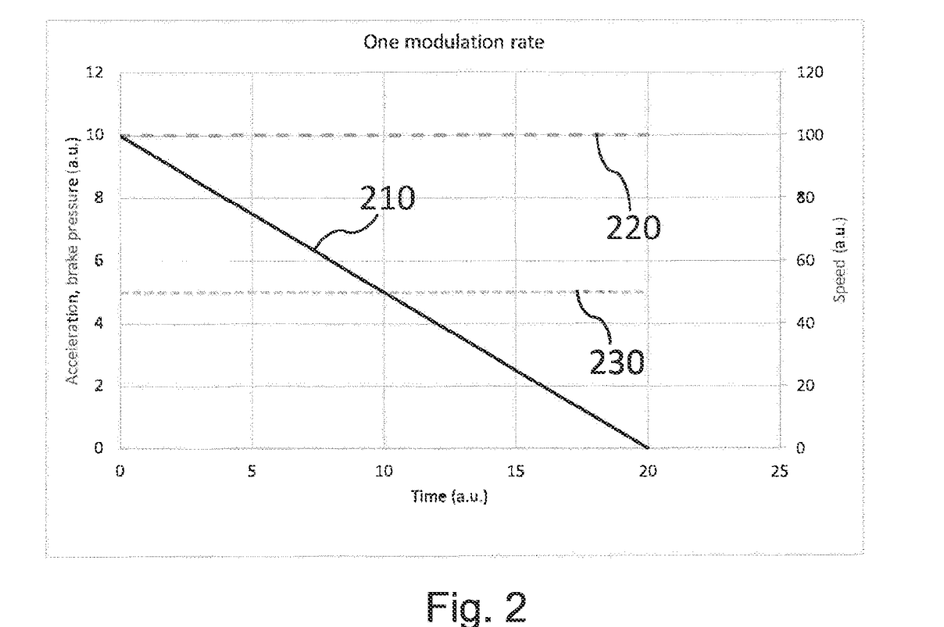
FIG. 2 illustrates an embodiment for a deceleration profile used to stop the autonomous vehicle.

FIG. 2 illustrates a first embodiment for a deceleration profile used to stop the autonomous vehicle in the case of a failure of the control of at least one brake system. In detail, FIG. 2 shows the deceleration, brake pressure, and speed as function of the time. Line 210 shows a constant decreasing speed of the vehicle with the time, where the stop is achieved after, for example, 20 seconds. Line 220 represents a dependence of the brake chamber pressure as function of the time. In this embodiment the brake chamber pressure is kept constant resulting likewise in a constant deceleration as shown by line 230.

Therefore, in this embodiment, the deceleration for stopping the vehicle is kept constant during the whole stopping process of the autonomous vehicle, i.e. the ramping consists of one constant deceleration and/or pressure modulation rate part (left axis). The resulting decrease of the speed is shown on the right axis It is understood that the concrete units used in these representations are only of minor interest. Therefore, the axes are marked with "a. u." (any unit). Important is the qualitative behavior of implementing the deceleration in the stopping process.

Figure 3:
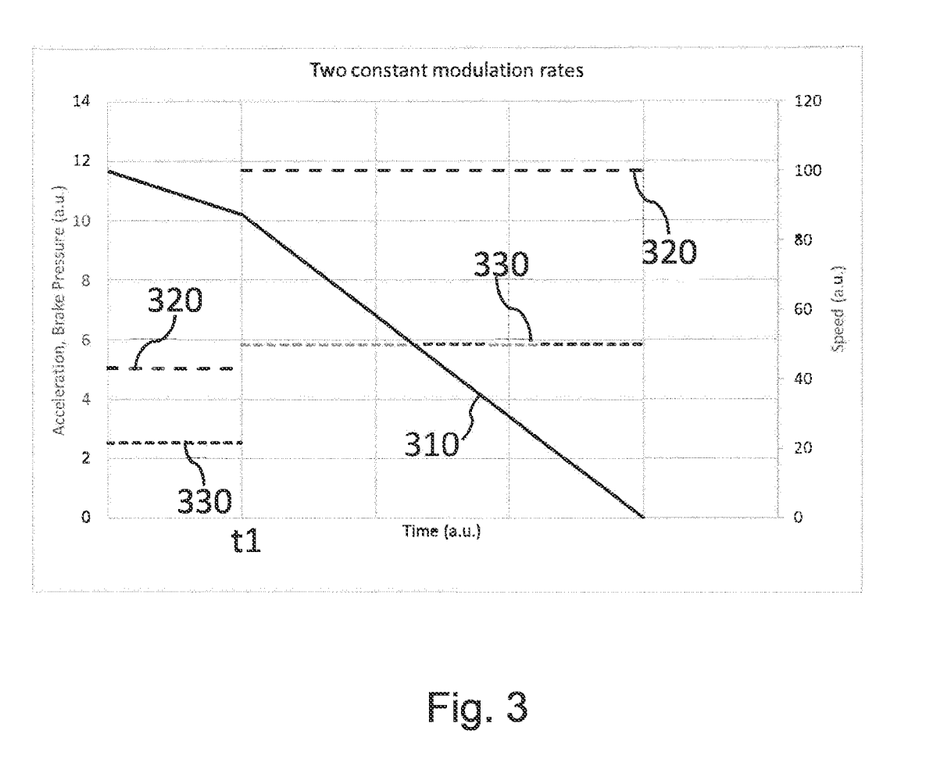
FIG. 3 illustrates another embodiment for a deceleration profile used to stop the autonomous vehicle.

FIG. 3 depicts another embodiment for the deceleration profile implemented by the supplemental control module 120. In this embodiment, two constant decelerations (which are piece-wise constant) are used as indicated by lines 330. In a first time period, for example, up to a first time t1 (e.g. the first 5 seconds), the deceleration is at a lower level, whereas after t1 the deceleration is increased to a value of below 6 (for example m/s$^2$), i.e. the deceleration has more than doubled. This piece-wise constant deceleration can be achieved by piece-wise constant brake chamber pressure as indicated by the lines 320. Again, the pressure below the first time t1 is lower, whereas after the first time t1, the brake chamber pressure is increased. As a consequence, the speed of the vehicle as indicated by line 310 is lowered during the first period with a smaller slope, whereas after the first time t1, the decrease of the vehicle speed is increased.

Therefore, in this embodiment, the deceleration for stopping the vehicle consists of two (or more) constant deceleration and/or pressure modulation rate part (left axis). The resulting decrease of the speed is again shown on the right axis.

Figure 4:
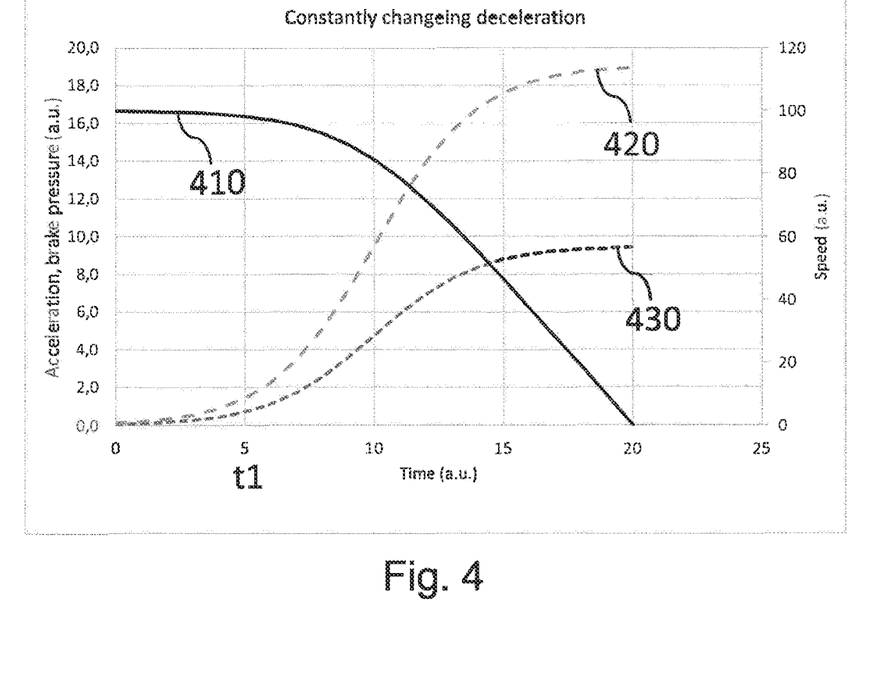
FIG. 4 illustrates yet another embodiment for a deceleration profile used to stop the autonomous vehicle.

FIG. 4 depicts yet another embodiment for the deceleration profile that may be implemented by the supplemental control module 120. The speed of the vehicle is now lowered non-linearly (see line 410) corresponding to a non-constant deceleration (see line 430) or a non-constant brake chamber pressure (see line 420). In this embodiment, the vehicle speed is kept almost constant for about 5 seconds (up to time t1 or any other value). At this time, the deceleration or correspondingly the brake chamber pressure is significantly (nonlinearly) increased resulting in a speed loss with a higher rate so that the vehicle stops again after the exemplary 20 seconds of time.

Therefore, in this embodiment, the deceleration for stopping the vehicle consists of a constantly changing deceleration and/or pressure modulation rate. The resulting decrease of the speed is again shown on the right axis.

The two-stage deceleration profiles as indicated in FIGS. 3 and 4 attempt to provide an alert to the following vehicles of the upcoming braking or to enable a distribution of the intended stop to other vehicles (e.g. contributing in a vehicle platooning). Hence, these profile aims to avoid collisions with the following traffic. It is apparent, whenever there is no imminent danger in front of the vehicle, the moment in time (i.e. the value for t1) where the stronger deceleration starts can be adjusted freely. It may, for example, depend: on the concrete traffic situation, on the distance to following vehicles, on whether or not the vehicle is part of a vehicle platooning etc.

Figure 5:
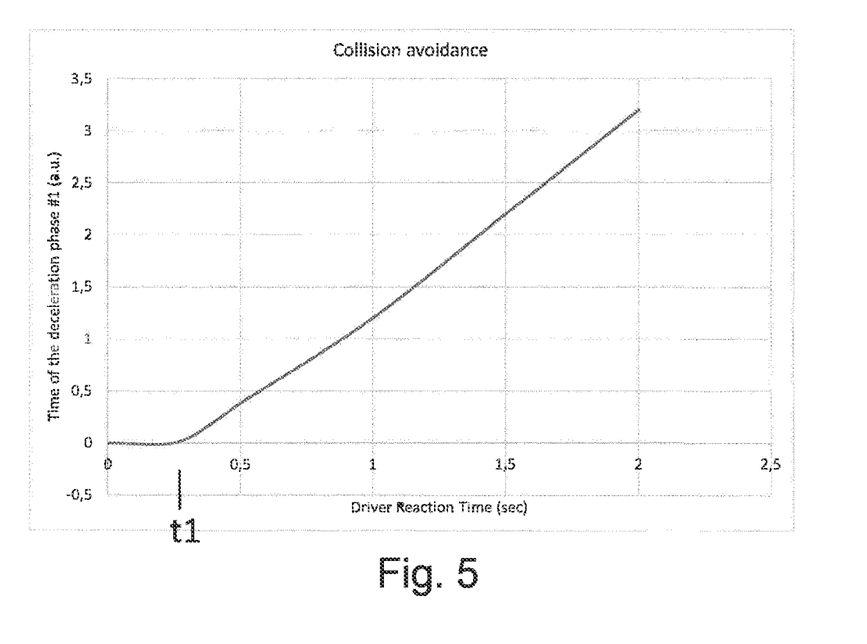
FIG. 5 illustrates an embodiment for determining a multi-stage deceleration profile used to stop the autonomous vehicle.

FIG. 5 illustrates the adjustment of the deceleration profile in the first deceleration phase (time t1 in FIG. 3 or FIG. 4). Of course, the length of the first deceleration phase (time t1) depends on a driver reaction time or the reaction time a system needs (e.g. in a vehicle platooning situation). Even a highly concentrated driver needs some time to notice the braking and to interpret the braking action correctly. The longer the driver/system reaction time is, the longer the first deceleration phase has to be chosen (t1 in FIG. 3 or FIG. 4).

Of course, it is understood that the aforementioned embodiments can be combined with each other and extended to more than two stages.

Figure 6:
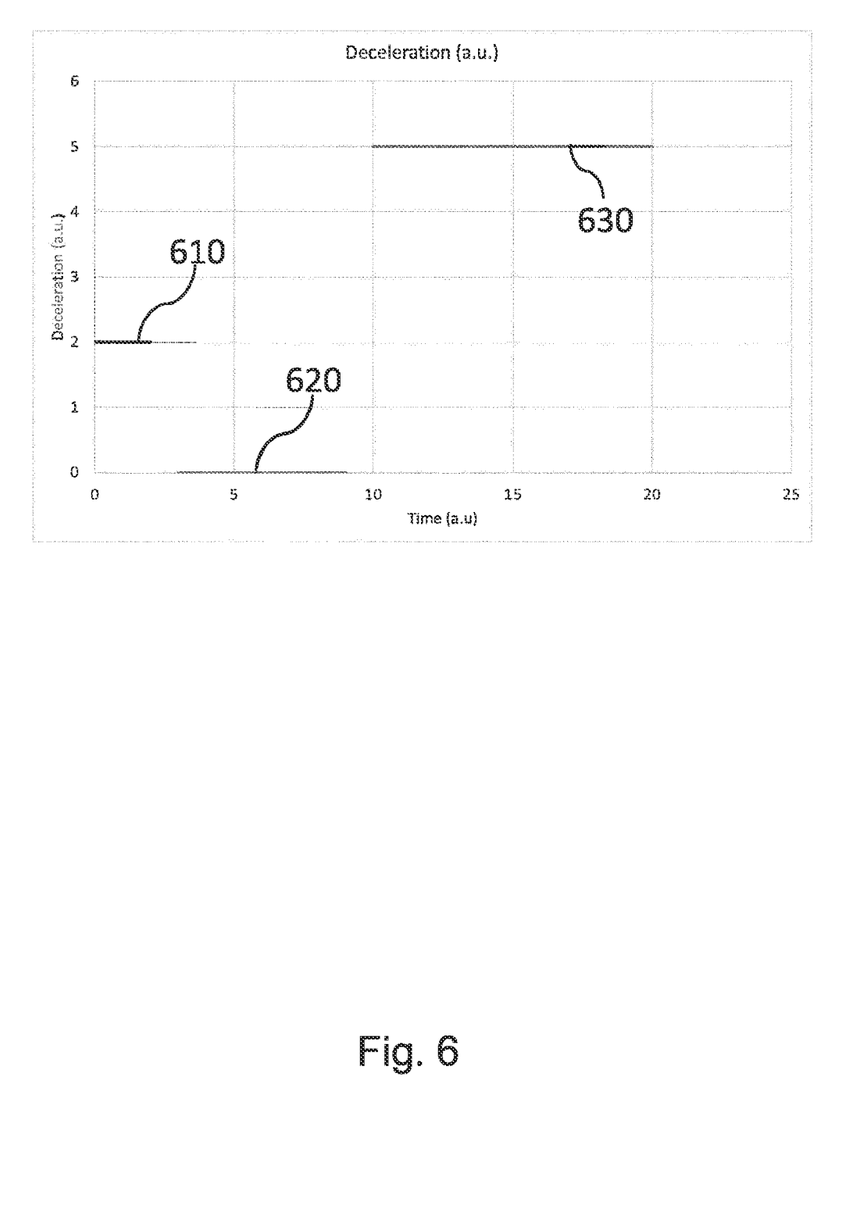
FIG. 6 illustrates yet another embodiment for a deceleration profile used to stop the autonomous vehicle.

FIG. 6 depicts, for example, an embodiment for a deceleration profile with three stages to further increase safety by providing an appropriate alert to following vehicles. In this embodiment, three constant deceleration periods 631, 632, 633 (decelerations as function of time) are combined. In a first period 631 (e.g. the first 2 . . . 3 seconds), a relatively low deceleration is applied (e.g. a short braking of about 2 m/s$^2$). In the second period 632 (e.g. the next 6 . . . 8 seconds), no deceleration is applied. And in the last period (e.g. after 10 seconds), a needed deceleration level is applied (e.g. about 5 m/s$^2$) to stop the vehicle finally (e.g. in a predetermined time or distance).

This embodiment provides the advantage, that the following vehicle is effectively alerted about the intended stop of the autonomous vehicle so that the driver, for example of the non-autonomous operated vehicle, can adjust her/his behavior on the stopping autonomous vehicle.

It is understood, the depicted constant deceleration may also be non-constant or can represent any curve. For example, the depicted three deceleration levels (small, zero, strong deceleration) can be connected by a smooth curve. In addition, further levels can be added to avoid sudden changes in the decelerations.

Figure 7:
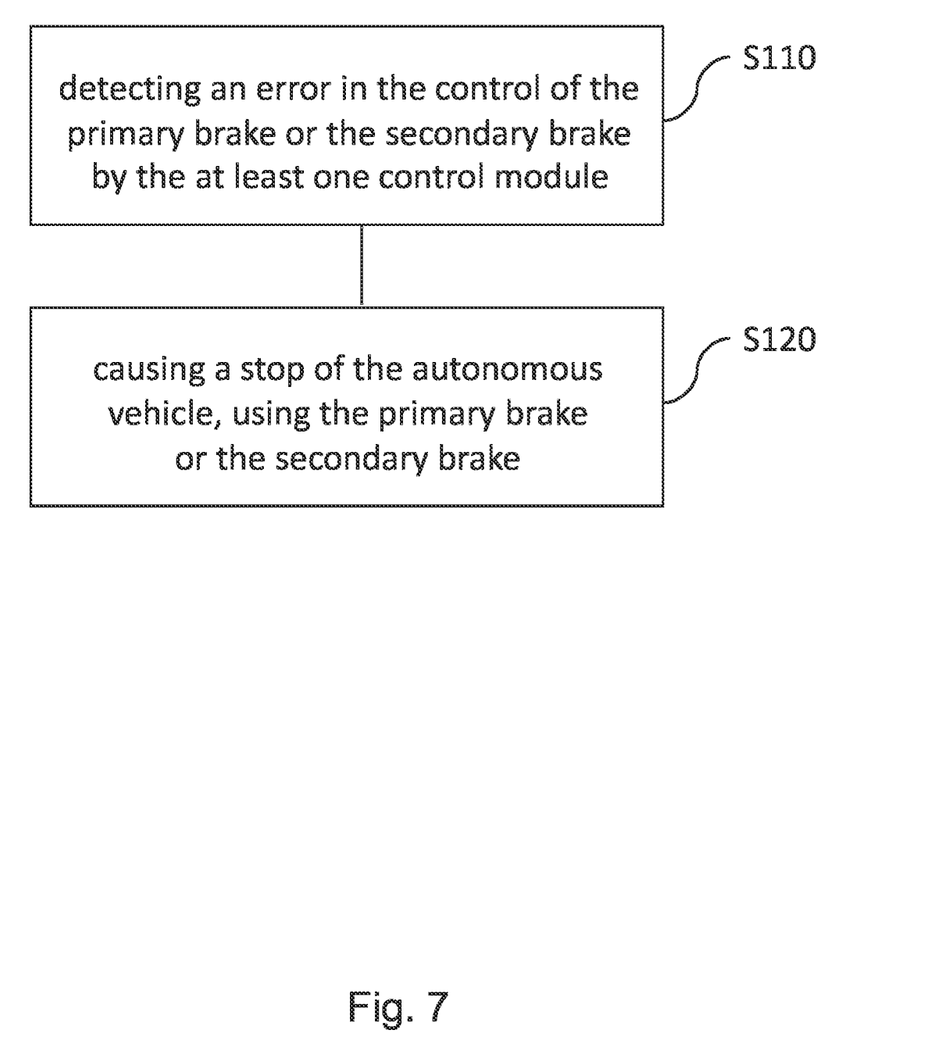
FIG. 7 depicts a flow diagram of a method for automatically stopping an autonomous vehicle according to an embodiment.

FIG. 7 depicts a flow diagram of a method for automatically stopping an autonomous vehicle with a primary brake 10 and a secondary brake 20 which are controlled by at least one control module 30. The method includes the steps of:
   detecting S110 an error, by an error detection module 120, in the control of the primary brake 10 or the secondary brake 20 by the at least one control module 110; and
   causing S120 a stop of the autonomous vehicle, by a supplemental control module 130 upon a detected error by the error module 120, using the primary brake 10 or the secondary brake 20.

This method may also be a computer-implemented method. A person of skill in the art would readily recognize that steps of various above-described methods may be performed by programmed computers. Embodiments are also intended to cover program storage devices, e.g., digital data storage media, which are machine or computer readable and encode machine-executable or computer-executable programs of instructions, wherein the instructions perform some or all of the acts of the above-described methods, when executed on the computer or processor.

Advantageous aspects of the various embodiments can be summarized as follows:

According to embodiments, the graceful degradation is to gradually ramp down the speed of the vehicle till a full stop is achieved, wherein a safe adaptation to the traffic situation can include more than one ramping section. The first ramping section may have lower deceleration to allow the surrounding traffic to notice and detect the stopping of the autonomous vehicle and prepare to stop his/hers/its own driver driven or autonomous vehicle. The second and potential following parts may have higher deceleration rate for fast stopping.

For vehicles with a pneumatic brake system, according to embodiments, the gradually ramping down the speed of the vehicle can be achieved by proportional application of the parking brake, where braking force is supplied by the springs pushing the brake pads to the corresponding parts of the wheels.

Embodiments can be implemented independently from the components of the vehicle responsible for the autonomous functions. Such autonomous functions may include sensors responsible for determining the surrounding traffic situation of the vehicle, coordinating or supporting functions for the autonomous electronic control units as well as the actuators. These are only nonlimiting examples. Other sensors may also be present.

Further embodiments for the graceful degradation relate to configurations where the autonomous logic controls the functions of the braking system that includes a compressor for providing the braking force for the pneumatic system. Thus, the compressor may also be controlled by the supplemental control module 120.

At least one of the following errors can be handled by the system:
   when the autonomous control logic 30 (or the primary brake control module 31 or the secondary brake control module 32) reports an error to the electronic parking brake;
   when electronic parking brake detects non-operability of the autonomous functions or controlling units;
   in situations when red warning lamps has been lit on the dashboard and it was up to the driver to stop the vehicle safely.

The error detection module 110 can detect these errors (e.g. receive corresponding signals) and trigger corresponding reactions by the supplemental control module 120.

According to embodiments the proportional braking period(s) and the full stopping period are configured so that— even at the end of the braking—the brake pads are not overheated. In addition, further embodiments ensure that the vehicle can still be started (after stopping) to move instantly the vehicle. For example, when the vehicle is stopped in a dangerous zone such as a railway crossing or a street crossing, the vehicle should be movable immediately. The system should not lock the vehicle. In particular, according to embodiments, the supplemental control module 120 is configured to allow starting and moving the vehicle away (for example by a driver or another person). To ensure safety also for this operation, the supplemental control module 120 may control the stopping operation to prevent overheated brakes to allow moving the vehicle safely to a new location with properly working brakes.

Further advantageous embodiments relate to the following numbered subject matters:

1) In a Method for a graceful degradation of failures of autonomous vehicles, when the service brake has lost the connection to the autonomous controller ECU or when the parking brake has lost the connection with the service brake/autonomous controller ECU, the speed of the vehicle may be gradually decreased by ramping down the speed until a full stop, e.g. by gradually decreasing spring brake chamber pressure.

2) Within this method, the ramping can include one constant deceleration and/or pressure modulation rate part (see FIG. 2) or more parts (time periods) with different deceleration and/or pressure modulation rates (see FIG. 3), or can be performed with constantly changing deceleration and/or pressure modulation rate (see FIG. 4).

3) Within this method, it is advisable for the ramping and/or pressure modulation to have at least two different sections (time periods). The first section may have a lower deceleration and/or pressure modulation rate to ensure that the follower vehicle has enough time to adapt to the changing speed of the followed autonomous vehicle by observing the deceleration and start to brake (see FIG. 3).

4) Within this method, the vehicle deceleration described in the preceding section (or time period) may be such that in the case of coordinated moving more than one vehicle ("platooning") the driver of follower non-autonomous vehicle shall also be able to adopt the changing traffic situation (see FIG. 5).

5) Within this method, the second section (second time period) following the first section (time period) introduced in subject matter 2) has larger deceleration and/or pressure modulation rate to ensure the fast stopping (see FIG. 3).

6) Within this method, in the case of more than two sections, there can be a section with zero intended deceleration and/or pressure modulation to allow longer adaptation after intended deceleration of the first vehicle (see FIG. 6).

7) Within this method, the deceleration and/or pressure modulation rate can be changed constantly and might comprise constant rate sections as well.

8) The decelerations and/or pressure modulations described in 1)-7) can be achieved by the parking brake of the vehicle, if the service break or the vehicle's controlling units report an error or the parking brake has lost its connection to the service break or the vehicle's controlling unit.

9) The decelerations and/or pressure modulations described in 1)-7) can be achieved by the service brake of the vehicle, if any of the vehicle's controlling unit reports error or the service break has lost the connection to the controller unit.

10) The decelerations and/or pressure modulations described in 1)-7) can be achieved by any of the operating braking system of the vehicle comprising, but not limited to, the service brake, parking brake, hand brake, emergency brake, auxiliary brake, retarder brake in case of any of the vehicle's controlling unit reports error or the connection has been lost between the braking system and the controller units.

11) In case of vehicles equipped with pneumatic braking system, the deceleration introduced in 1) shall be ensured with non-operating service brake or in the case of loss of air pressure as well. In this case, the deceleration can be ensured with the parking brake. In this case, the ramping down of the vehicle speed can be ensured by decreasing the pressure in spring brake chamber.

12) The stopping of the vehicle shall be executed in a way that in the case of an instant restart of the vehicle effective the braking system shall be able to stop the vehicle effectively again.

13) The condition described in 12) shall be ensured by braking the vehicle in a way that hot runner situation is avoided by maximizing the ramping time and applied brake force to ensure that the brake pads are not overheated.

14) Within the method, the vehicle deceleration described in 1)-7) may be such that in the case of coordinated moving more than one vehicle ("platooning") the deceleration shall be made so that the speed and road condition of the follower autonomous vehicle shall is included in the calculation if the deceleration of the ramping down sections so the all the follower vehicles are able to adopt the changing traffic situation without collision or wheel blocking.

15) Within the method, the function described in 14) can be achieved using the known vehicle speed of the follower vehicles and road condition when the platooning configuration allows the transfer of such data among the participants of the platooning.

16) Within the method, the function described in 14) can be achieved using the estimated vehicle speed of the follower vehicles and road condition when the platooning configuration does not allow the transfer of such data among the participants of the platooning or error of the vehicle's controlling unit does not provide these data.

17) In addition to the graceful degradation described in 1)-16), an additional safety mechanism, if the vehicle ECU sends an XPD prop request (external, proportional park request), or the supplementary control module 120 initiated the stopping of the vehicle the horn of the vehicle is activated. This is appropriate, since the service brake is lost and there is a need for slowing down the vehicle, so drivers around will be notified and will be prepared for maneuvers of the autonomous vehicle.

The description and drawings merely illustrate the principles of the disclosure. It will thus be appreciated that those skilled in the art will be able to devise various arrangements that, although not explicitly described or shown herein, embody the principles of the disclosure and are included within its scope.

Furthermore, while each embodiment may stand on its own as a separate example, it is to be noted that in other embodiments the defined features can be combined differently, i.e. a particular feature descripted in one embodiment may also be realized in other embodiments. Such combinations are covered by the disclosure herein unless it is stated that a specific combination is not intended.

THE LIST OF REFERENCE SIGNS IS AS FOLLOWS 10 primary brake (for example service brake)
20 secondary brake (for example parking brake)
30 control module(s)
110 error detection module
120 supplemental control module
210, 310, . . . speed profiles
220, 320, . . . brake chamber pressure profiles
230, 330, . . . deceleration profiles

The invention claimed is:

1. A system for automatically stopping an autonomous vehicle, the autonomous vehicle including a primary brake and a secondary brake controlled by one control module or different control modules, comprising:
   an error detection module to detect an error in the control of the primary brake or the secondary brake by the one control module or different control modules; and
   a supplemental control module, upon a detected error by the error detection module, to cause a stop of the autonomous vehicle using the primary brake or the secondary brake;
   wherein the error detection module receives a corresponding error signal or a warning signal that is provided by a control unit of the vehicle, and wherein the error detection module is configured to access sensors that sense a failure resulting in a loss of control of the vehicle, and
   wherein the supplemental control module is configured to stop the autonomous vehicle using at least one deceleration profile having three stages to increase safety by providing an appropriate alert to following vehicles, in which three constant deceleration periods are combined, in which in a first period, a lower deceleration is applied, in which in a second period, no deceleration is applied, and in which in a last period, a required deceleration level is applied to stop finally the vehicle in a predetermined time or distance.

2. The system of claim 1, wherein the different control modules include a primary control module for controlling the primary brake and a secondary control module for controlling the secondary brake.

3. The system of claim 1, wherein the supplemental control module is configured to stop the autonomous vehicle also using at least one of the following deceleration profiles:
a constant deceleration, and/or
in subsequent time periods piecewise constant decelerations, and/or
a non-constant deceleration, and/or
start with a lower deceleration followed by a higher deceleration, or start with a higher deceleration followed by a lower deceleration, to allow following vehicles to adapt to the stopping of the autonomous vehicles, and/or
an adjusted deceleration to increase or to maximize the braking time to avoid an overheating of brake pads.

4. The system of claim 1, wherein the vehicle is configured to be driven in a coordinated movement with one or more other vehicles, including vehicle platooning, and wherein the supplemental control module is configured to perform at least one of the following:
starting a vehicle deceleration after an idle time to allow to distribute an intended braking to the one or more other vehicles; and/or
stopping the vehicle so that a following non-autonomous vehicle is able to prepare itself.

5. The system of claim 4, wherein the coordinated movement is defined in configuration data, and wherein the supplemental control module is configured to receive or to send data related to the configuration data from/to the other vehicle(s) to enable a consideration of the configuration data.

6. The system of claim 4, wherein when data transfer between platooning vehicles is not possible, the supplemental control module is configured to estimate configuration data of the coordinated movement.

7. The system of claim 1, wherein the supplemental control module is configured to allow an instant release of the used brake to enable a restart of the vehicle after the stop.

8. The system of claim 1, wherein the vehicle includes a horn, and wherein the error detection module or the supplemental control module is configured to activate the horn to alert surrounding traffic participants about an impending stop of the autonomous vehicle.

9. The system of claim 1, wherein the error detection module is configured to report the detected error.

10. The system of claim 1, further comprising:
an independent power supply to provide electric power even when the power supply for the one control module or the different control modules is disrupted.

11. An autonomously operable vehicle, comprising:
a system for automatically stopping the autonomously operable vehicle, the vehicle including a primary brake and a secondary brake controlled by one control module or different control modules, including:
an error detection module to detect an error in the control of the primary brake or the secondary brake by the one control module or different control modules; and
a supplemental control module, upon a detected error by the error detection module, to cause a stop of the autonomous vehicle using the primary brake or the secondary brake;
wherein the error detection module receives a corresponding error signal or a warning signal that is provided by a control unit of the vehicle, and wherein the error detection module is configured to access sensors that sense a failure resulting in a loss of control of the vehicle, and
wherein the supplemental control module is configured to stop the autonomous vehicle using at least one deceleration profile having three stages to increase safety by providing an appropriate alert to following vehicles, in which three constant deceleration periods are combined, in which in a first period, a lower deceleration is applied, in which in a second period, no deceleration is applied, and in which in a last period, a required deceleration level is applied to stop finally the vehicle in a predetermined time or distance.

12. The vehicle of claim 11, wherein the primary brake includes a service brake, and wherein the secondary brake includes at least one of the following brake systems: a parking brake, a hand brake, an emergency brake, an auxiliary brake, and/or a retarder brake.

13. A method for automatically stopping an autonomous vehicle, the autonomous vehicle including a primary brake and a secondary brake which are controlled by one control module or different control modules, the method comprising:
detecting an error, by an error detection module, in the control of the primary brake or the secondary brake by the one control module or the different control modules; and
causing a stop of the autonomous vehicle, by a supplemental control module upon a detected error by the error module, using the primary brake or the secondary brake;
wherein the error detection module receives a corresponding error signal or a warning signal that is provided by a control unit of the vehicle, and wherein the error detection module is configured to access sensors that sense a failure resulting in a loss of control of the vehicle, and
wherein the supplemental control module is configured to stop the autonomous vehicle using at least one deceleration profile having three stages to increase safety by providing an appropriate alert to following vehicles, in which three constant deceleration periods are combined, in which in a first period, a lower deceleration is applied, in which in a second period, no deceleration is applied, and in which in a last period, a required deceleration level is applied to stop finally the vehicle in a predetermined time or distance.

14. A non-transitory computer readable medium having a computer program, which is executable by a processor, comprising:
a program code arrangement having program code for automatically stopping an autonomous vehicle, the autonomous vehicle including a primary brake and a secondary brake which are controlled by one control module or different control modules, by performing the following:
detecting an error, by an error detection module, in the control of the primary brake or the secondary brake by the one control module or the different control modules; and
causing a stop of the autonomous vehicle, by a supplemental control module upon a detected error by the error module, using the primary brake or the secondary brake;
wherein the error detection module receives a corresponding error signal or a warning signal that is provided by a control unit of the vehicle, and wherein the error detection module is configured to access sensors that sense a failure resulting in a loss of control of the vehicle, and wherein the supplemental control module is configured to stop the autonomous vehicle using at least one deceleration profile having three stages to increase safety by providing an appropriate alert to following vehicles, in which three constant deceleration periods are combined, in which in a first period, a lower deceleration is applied, in which in a second period, no deceleration is applied, and in which in a last period, a required deceleration level is applied to stop finally the vehicle in a predetermined time or distance.

* * * * *